United States Patent [19]

Theiler

[11] 4,395,428

[45] Jul. 26, 1983

[54] PROCESS FOR PREPARING COOKED MEAT HAVING REDUCED LEVELS OF N-NITROSAMINES

[75] Inventor: Richard F. Theiler, Scottsdale, Ariz.

[73] Assignee: Armour and Company, Phoenix, Ariz.

[21] Appl. No.: 286,743

[22] Filed: Jul. 27, 1981

[51] Int. Cl.³ .......................... A23B 4/02; A23B 4/14
[52] U.S. Cl. ................................. 426/266; 426/281; 426/332; 426/641; 426/644; 426/646; 426/652
[58] Field of Search ............... 426/264, 265, 266, 281, 426/332, 335, 533, 641, 646, 650, 652, 644

[56] References Cited

U.S. PATENT DOCUMENTS

| | | | |
|---|---|---|---|
| 2,770,550 | 11/1956 | Hall et al. | 99/222 |
| 2,863,777 | 12/1958 | Dekker et al. | 99/157 |
| 2,902,369 | 9/1959 | Komarik | 99/159 |
| 2,974,047 | 3/1961 | Hohmes . | |
| 3,672,913 | 6/1972 | Podebradsky | 99/109 |
| 3,868,468 | 2/1975 | Tompkin | 426/243 |
| 3,901,981 | 8/1975 | Draudt | 426/266 |
| 3,966,974 | 6/1976 | Bharucha et al. | 426/265 |
| 4,112,133 | 9/1978 | Rao et al. | 426/650 |
| 4,250,199 | 2/1981 | Underwood et al. | 426/533 |
| 4,342,789 | 8/1982 | Ueno et al. | 426/266 |

FOREIGN PATENT DOCUMENTS

| | | | |
|---|---|---|---|
| 549657 | 12/1957 | Canada | 426/266 |
| 411006 | 5/1934 | United Kingdom | 426/266 |

OTHER PUBLICATIONS

Gorbatov et al., Liquid Smokes for Use in Cured Meats, *Food Technology*, 25, 71–77, (1971).
Booth et al., A New Approach to Wood Smoke Flavoring, *Food Trade Review*, 25, 26, 32, Jun. 1971.
*Red Arrow Products Technical Directory*, pp. 1–32.
Knowles et al., Nitrosation of Phenols in Smoked Bacon, *Nature*, 249, pp. 672–673, Jun. 1974.
Knowles et al., Phenols in Smoked Cured Meats, Phenolic Composition, etc., *J. Sci. Fd. Agric.*, 26, pp. 189–196, 1975.
Knowles et al., Phenols in Smoked Cured Meats: Nitrosation of Phenols, etc., *J. Sci. Fd. Agric.*, 26, pp. 267–276, 1975.
Davies et al., Catalytic Effect on Nitrosophenols on N-Nitrosamine Formation, *Nature*, 266, pp. 657–658, Apr. 1977.
Fiddler et al., Inhibition of Volatile Nitrosamines in Fried Bacon by Use of Cure Solubilized $\alpha$-Tocopherol, *J. Agric. Food Chem.*, 26, 653–656, 1978.
Pensabene et al., Effect of $\alpha$-Tocopherol Formulations on the Inhibition of Nitrosopyrrolidine etc.
O'Brien, USDA Acts on the Bacon Dilemma, *Food Product Development*, pp. 32–37, Jul. 1978.

*Primary Examiner*—Arthur L. Corbin
*Attorney, Agent, or Firm*—Frank T. Barber

[57] ABSTRACT

A process for preparing cured meat which, when cooked for consumption, contains substantially reduced levels of N-nitrosamines. The process comprises the steps of introducing into uncured meat a nitrite-containing curing composition, a tocopherol and an additional nitrosamine-inhibiting substance which may be liquid smoke, a reducing sugar, or a combination thereof, and thereafter processing the meat to effect curing. The invention is applicable either to ground meat, such as sausage, or to intact cuts of meat, such as ham or bacon bellies.

17 Claims, No Drawings

PROCESS FOR PREPARING COOKED MEAT HAVING REDUCED LEVELS OF N-NITROSAMINES

This invention relates to a process for preparing cured meat and, more particularly, to a process for preparing cured meat which, when cooked, will have reduced levels of N-nitrosamines.

BACKGROUND OF THE INVENTION

For many years it has been common practice to prepare cured meat by treating the uncured meat with a curing composition and then smoking the cured product to impart a desirable flavor. A major component of the composition is sodium nitrite which inhibits the germination of Clostridium botulinum spores, thus ensuring that the cured product will be free of the deadly toxin produced by this bacterium. In recent years, however, much controversy has surrounded the use of sodium nitrite because there have been allegations that residual nitrite from the curing composition can react with organic amines present in various cured meat products to form carcinogenic nitrosamines. This problem is accentuated with certain products because nitrosamine formation is induced by the elevated temperatures encountered when these products are cooked for consumption; i.e., those exceeding 300° F.

Many approaches have been considered in seeking a remedy to this problem and proposed remedies have included eliminating nitrite from the curing composition or reducing residual nitrite levels in the cured product. Neither of these approaches is particularly satisfactory, however, because there is presently no suitable substitute for nitrite, and because reducing nitrite levels could increase the likelihood that C. botulinum spores would grow in the cured product.

Another approach has involved a search for substances to be added to the curing composition which might inhibit the formation of nitrosamines by interfering in some way with the nitrite/amine reaction by which the nitrosamines are formed. This approach has been hampered by the unpredictability of chemical reactions in the complex meat system which forms the environment for the reaction in question. Although results obtained by various workers have, for this reason, been inconsistent and contradictory, a number of substances have been identified which appear to exhibit some degree of inhibitory effect. For example, compounds, such as sodium ascorbate, sodium erythorbate, alpha-tocopherol, etc. have been reported in the literature as having the ability to reduce nitrosamine formation. (See Fiddler et al, *J. Agric. Food Chem.*, Vol. 26, No. 3, 1978.)

One of the deficiencies of the inhibiting substances referred to above is their limited inhibitory action. In most cases, the substances have been found to cause nitrosamine reductions of up to 50%, but this still leaves a substantial problem in dealing with the remaining 50%. There has been an intensive search for more potent means of inhibiting the nitrosamine reaction.

SUMMARY OF THE INVENTION

The present invention involves a process which is capable of achieving substantially greater nitrosamine reductions in the preparation of cured meat products. The process comprises the steps of introducing into uncured meat a nitrite-containing curing composition, together with a tocopherol and an additional inhibiting substance which may be either a liquid smoke or a reducing sugar, or a combination thereof, and thereafter processing the meat to effect curing.

It has been found that, while the tocopherol, the liquid smoke and the reducing sugar each is capable of reducing nitrosamines, the above combinations provide reductions substantially greater than can be obtained with any of the inhibitors used alone. Nitrosamine reductions as great as 85% can be obtained with the combinations described herein.

Moreover, it has been found that this improved inhibitory action can be obtained without significantly affecting the level of residual nitrite in the cured meat, and thus the combination of the present invention, while reducing nitrosamine levels, does not interfere with the C. botulinum protection offered by the nitrite itself.

Further, it has been found that the practice of the present invention results in a product which is significantly superior to a regular control product, from the standpoint of flavor and overall acceptability.

DETAILED DESCRIPTION OF PREFERRED EMBODIMENT

The invention is applicable to two different kinds of cured meat products—namely, ground cured meat products (such as sausage) and intact or unground cured meat products (such as ham and bacon)—and in the following description the production of these two types will be taken up separately.

Ground Cured Meat Products

The process of the invention, as applied to ground cured meat products, comprises the steps of first grinding the uncured meat, mixing it with a nitrite-containing curing composition, together with a tocopherol and an additional inhibiting substance which may be either a liquid smoke or a reducing sugar, or a combination thereof, and thereafter processing the meat to effect curing.

The meat to be treated in the practice of the present invention may be any meat species which normally is prepared for consumption in cured form, and may include pork, beef, veal, and the like, as well as poultry meat including turkey and chicken. The form of ground product may include meats which are ground and mixed with other ingredients, such as fat and water, to provide emulsions which are cured and processed into various forms of sausage, but the meat may also be in the form of ground loaf or roll products which are prepared in cured form.

The curing composition to be mixed with the ground meat contains sodium nitrite, or other source of nitrite ions, as well as other conventional cure ingredients such as buffering agents to stabilize the nitrite, agents to facilitate curing such as sodium chloride and sodium erythorbate or ascorbic acid, and flavoring agents such as brown sugar or synthetic flavors. The curing composition may be mixed with the ground meat in dry form, or it may be dissolved or dispersed in water to provide a curing pickle to be mixed with the meat.

The tocopherol to be used in the invention may be any of the group of chemically related, lipid soluble substances that possess vitamin E activity. They are present in vegetable oils, cereals, nuts and leafy vegetables, vegetable oils being the most important source. The most common tocopherol is alphatocopherol, but beta, gamma and delta tocopherols also occur naturally. The word "tocopherol" as used herein contemplates all of these compounds and their derivatives, particularly the acetate and succinate esters, and mixtures thereof. Certain of these compounds are listed as GRAS for use in food products as chemical preservatives, or as nutrients and/or dietary supplements.

Reducing sugars, as used in the invention, are those sugars which will reduce mild oxidizing agents such as Fehling's solution, Tollen's Reagent and Benedict's solution, and examples of such sugars are glucose, maltose, fructose and lactose. Non-reducing sugars, such as sucrose from sugar cane, beet sugar, corn sugar, etc. have virtually no effect on N-nitrosamine formation and are not effective in the present invention.

The liquid smoke to be used when the invention is applied to ground meat may be any of the commercially available liquid smokes. Those used most often are generally either aqueous or non-aqueous (oil based) solutions, although powdered forms of liquid smokes are also available. Examples of such smokes are CharSol which is an aqueous solution of hardwood smoke that has been processed to remove particulate matter and CharOil which is a vegetable oil extract of CharSol. These products are produced by Red Arrow Products Company and are commonly used primarily for surface application to intact meat products such as bacon bellies and ham and for either surface application or direct addition to sausage products. The liquid smoke products which have been specially developed for incorporation into injectable brine (as described in the following section entitled "Intact Cured Meat Products") may also be used in application of the invention to ground meat, although these specialized forms have been developed to avoid clogging of the injection needles, and this feature is not essential when the liquid smoke is only mixed into the ground meat product.

The basic composition of liquid smokes has been investigated and it is reported that they contain three basic classes of components: acids, phenols and carbonyl compounds, all of which contribute to the flavor and color characteristics of smoked products. The phenols, which are acidic in nature, and the acids account for the low pH of liquid smoke, which is generally on the order of 2 to 3. Furthermore, the phenols contribute greatly to the smokey flavor imparted by the liquid smokes. The carbonyl compounds, which are more neutral, constitute a major portion of the color-forming components.

When the invention is applied to the treatment of ground meat, the form and the sequence in which the curing composition, the tocopherol and the reducing sugar and/or liquid smoke are added are not critical, although it is necessary that the liquid smoke be preneutralized or buffered so that the nitrite will not be destroyed or reduced by action of the acid in the liquid smoke. In one embodiment, all of the above ingredients may merely be mixed into the ground meat in dry form prior to processing. However, an alternative is to prepare a curing solution which contains the various additives in their desired proportions and then mix this solution with the ground meat prior to conventional processing. For example, a typical curing solution may be prepared containing approximately 80% water, 15% sodium chloride, 2.5% sodium tripolyphosphate, 0.60% sodium erythorbate monohydrate, 0.15% sodium nitrite, 0.02% flavoring, and containing also the tocopherol, reducing sugar and/or liquid smoke in their desired concentrations, and such a solution can be mixed into the ground meat. The proportions of curing ingredients are not critical to the operability of the invention, and the desired reduction of nitrosamines will be obtained when any conventional, stable nitrite-containing pickle is used in combination with tocopherol and reducing sugar and/or liquid smoke.

The amounts of the nitrosamine-inhibiting substances to be used can vary depending on a number of factors, including the amount of the curing pickle to be used and the flavor characteristics which are desired for the cooked, cured product. However, it had been found that nitrosamine levels will be reduced in accordance with the invention as applied to ground meat if the concentration of tocopherol is in the range of 10–1,000 ppm based on the weight of the uncured meat, the liquid smoke is in concentration to provide 5–800 ppm phenols and 10–4,000 ppm carbonyl compounds based on the weight of the uncured meat, and the concentration of the reducing sugar is in the range of 10 ppm to 40,000 ppm based on the uncured meat weight. To obtain superior flavor characteristics, the concentration range for the tocopherol will be 100–800 ppm, for the phenols 40–240 ppm, for the carbonyl compounds 30–720 ppm, and for the reducing sugar 1,000–9,000 ppm, all said ppm concentrations being based on the weight of the uncured meat.

Surprisingly it has been discovered that when tocopherol and liquid smoke are added in combination to ground meat, substantially greater reductions of nitrosamines are obtained than when the individual components are mixed with the meat. Also, when tocopherol and reducing sugar are used in combination, substantially greater nitrosamine reductions are obtained than with the individual components. Further, when all three are used in combination dramatically greater reductions result than from use of any of the individual compounds. Moreover, these results are obtained without significantly reducing nitrite levels and without adverse affect on the flavor and overall acceptability of the meat product.

Intact Cured Meat Products

The process of the invention, as applied to intact cured meat products such as bacon or ham, comprises the steps of preparing a nitrite-stable curing solution comprising a nitrite-containing pickle, a tocopherol and an inhibitor substance which may be either liquid smoke or reducing sugar, or a mixture thereof, injecting the curing solution into the uncured intact (unground) meat, and processing the meat to effect curing.

The meat to be treated in this embodiment of the invention may be any meat which is cured in unground form by needle injection of the curing solution into intact pieces of meat. The more popular examples are ham and bacon and similar pork products, but equivalent forms from other species such as beef, veal, poultry and the like are also contemplated.

When the invention is applied to intact meat which is to be needle injected with curing solution, the tocopherol, reducing sugar and liquid smoke additives are as described and defined in the preceding section entitled "Ground Cured Meat Products", but the needle injection procedure makes it important that these various ingredients be miscible in the curing solution so that the needles will not be clogged, and this in turn imposes certain conditions on the form and sequence in which the additive ingredients can be used. These considerations relate primarily to the relative insolubility of the tocopherols and the precipitation problems which can be encountered with certain liquid smokes. Virtually any liquid smoke which can be pumped in pickle in combination with one or more tocopherols and one or more reducing sugars at relatively low concentration will give satisfactory results. However, as the quantities of liquid smoke and tocopherol in the pickle are increased, solubility problems and other stability problems are often encountered which can interfere with the pumping process.

Addition of acidic aqueous liquid smoke to pickle causes a rapid reduction in nitrite levels unless the pickle is buffered, and the buffer itself can have a detrimental affect on conventional liquid smoke because it can induce formation of an insouble precipitate which can plug the injection needles. Furthermore, at higher concentrations, conventional liquid smokes with high carbonyl compound content tend to cause staining of the meat. If the liquid smokes are pre-neutralized to avoid the aforementioned problems, a resinous precipitate forms which can also cause needle-plugging problems, and the resulting mixture may have undesirably reduced levels of phenols and carbonyls. Such preneutralization can be accomplished by adding a base such as sodium hydroxide to the acidic liquid smoke to bring the pH to ca 6–7 before it is added to the pickle.

Problems associated with oil-based liquid smokes tend to make them less satisfactory than aqueous liquid smokes for injection purposes. The concentrations of the phenols and carbonyl compounds in the oil-based liquid smokes are substantially lower than those for the aqueous liquid smokes so that proportionally more of the oil-based smoke is required to obtain the same result. This concentration factor in combination with the fact that the oil is not readily miscible with pickle compounds the problems associated with the formation of an injectable liquid smoke solution and makes the use of oil-based liquid smokes less desirable when the pickle is to be pumped.

Another problem previously noted is the staining of the meat along the path of injection by the carbonyl compounds found in the liquid smoke. This problem may be minimized by injecting an essentially uniform liquid smoke-reducing sugar-tocopherol-pickle combination in which the liquid smoke has relatively reduced levels of the color-forming constituents. Aro-Smoke, a product recently introduced by Red Arrow Products Company, may be used as the liquid smoke or, alternatively, the following procedure may be employed. An aqueous solution of wood smoke is prepared and refined by means well known in the art or, if so desired, a commericial aqueous wood smoke, such as Red Arrow's CharSol C-10, may be used as the starting solution. The pH of the solution is adjusted to ca 10–11 with an appropriate base, such as sodium hydroxide, and the mixture is extracted with diethyl ether to remove certain of the carbonyl-containing compounds. The aqueous solution is reacidified to a pH of ca 2–3 with an appropriate acid, such as hydrochloric acid, and the mixture is extracted with diethyl ether. After evaporation of the ether, a water-insoluble extract is obtained for which the ratio of carbonyl-containing compounds to phenolic constituents is in the range of 0.5–5 to 1. Preferably, this ratio will be in the range of 0.75–3 to 1 to obtain suppression of N-nitrosamines and superior flavor characteristics when the cured meat is cooked for consumption.

Because the extract is water insoluble, a food grade emulsifier is required to obtain an injectable, preferably one-phase, mixture of the extract in pickle. A wide range of suitable emulsifiers is available and the effective amount of emulsifier required will depend on the characteristics displayed by each individual emulsifier. Polysorbate emulsifiers are generally satisfactory to practice the present invention and polysorbate 80 is particularly preferred when not less than 0.2% of emulsifier is used, based on the weight of the pickle solution. Certain other emulsifiers which provide suitable emulsification may also exhibit other characteristics which make them less desirable to use. Lecithin, for example, has been shown to increase N-nitrosopyrrolidine formation. Therefore, in view of the result which is to be achieved by utilizing the process of the present invention, emulsifiers which exhibit this tendency should be avoided.

The use of emulsifiers is particularly advantageous when more than minimal amounts of tocopherols are used because the emulsifiers prevent separation of the tocopherols. To practice the present invention, a pickle is prepared by means well known in the art to preferably contain standard ingredients such as sodium nitrite, sodium erythorbate, sodium chloride, and perhaps a buffer such as sodium tripolyphosphate. In one method for achieving an injectable combination, the tocopherol can be dispersed in liquid smoke containing an appropriate emulsifier and the mixture is dispersed in the pickle. The reducing sugar may be added to the pickle either before or after the pickle is mixed with the tocopherol/liquid smoke combination.

The pickle may be either buffered or unbuffered. If it is unbuffered care must be taken to preneutralize the acidic liquid smoke with an appropriate base as previously described so that nitrite levels are not depleted; however, preneutralization will be unnecessary in virtually all instances if the pickle is buffered. Similar considerations also apply if an emulsifier is used to obtain an essentially uniform solution for injection.

When the invention is applied to intact meat which is to be needle injected with curing solution, it has been found that nitrosamine levels will be reduced effectively if the concentration of tocopherol is in the range of 10–1,000 ppm based on the weight of the uncured meat, the liquid smoke is in concentration to provide 5–400 ppm of phenols and 10–2,000 ppm carbonyl compounds based on the weight of the uncured meat, and the concentration of reducing sugar is in the range of 150–30,000 ppm based on the uncured meat weight. To obtain superior flavor characteristics, the concentration range for the tocopherol will be 100–500 ppm, for the phenols 40–120 ppm, for the carbonyl compounds 30–360 ppm, and for the reducing sugar 1,000–20,000 ppm, all said ppm concentrations being based on the weight of the uncured meat. When the intact meat is bacon, the concentrations will be the same as above, except that the practical upper limit for reducing sugar will be about 10,000 ppm.

In application of the invention to needle-injection of intact meat, as will application to ground meat, it has been found that when tocopherol and liquid smoke are used in combination, substantially greater reductions in nitrosamines are obtained when the individual additives are used alone. Also, when tocopherol and reducing sugar are used in combination, substantially greater nitrosamine reductions are obtained than with the individual components. Further, when all three are used together, dramatically greater reductions result than from the use of any of the individual components. Moreover, these results are obtained without any significant reduction in residual nitrite levels, and with a surprising improvement in flavor and overall acceptability of the treated product, as compared with control product.

To evaluate the improvements demonstrated by the present invention, meat products were exposed to reducing sugars, tocopherols and several liquid smokes. The following examples are illustrative.

EXAMPLE 1

The phenolic- and carbonyl-compounds content of several liquid smokes was determined so that an appropriate amount of liquid smoke could be added to the pickle. A sample analytical process is as follows.

A 200-ml quantity of CharSol C-10 was treated according to the procedure set forth above on page 9 to give 8.4 g of oily extract. A 29% solution of the extract in polysorbate 80 was prepared and the phenolic- and carbonyl-compound constituents of this smoke ("Prepared Smoke" as used in this example) were assayed spectrophotometrically using 2,6-dimethoxyphenol and 2-butanone as the standards, respectively. From the assay results the carbonyl/phenol ratio was determined. Similar assays and ratio calculations were also made for Aro-Smoke (which contained ca 80% polysorbate), CharSol C-10, and Royal Smoke, another commercial aqueous liquid smoke from Griffith Laboratories. The following results were obtained.

| Sample | Phenols (mg/ml) | Carbonyls (mg/ml) | Ratio Carbonyls:Phenols |
|---|---|---|---|
| Prepared Smoke | 35 | 54 | 1.5:1 |
| Aro-Smoke | 39 | 54 | 1.4:1 |
| Royal Smoke | 7.5 | 79 | 10.5:1 |
| CharSol C-10 | 14 | 99 | 7.1:1 |

EXAMPLE 2

Eight curing compositions were prepared having the compositions listed in the table below. The "Prepared Smoke" was prepared by the extraction procedure set forth above on page 9, whereas the "Neutralized CharSol C-6" was prepared by treating CharSol C-6 with solid sodium hydroxide pellets to bring the pH to ca. 6.5.

ous, the mixture was slurried and then added to the pork; however, the lack of homogeneity was unimportant because the various constituents were uniformly dispersed in the ground pork during the subsequent blending step. Each of the blended mixtures was stuffed into sausage casings, stored at 4° C. for several hours, and then heat processed in an Alcar Smokehouse until an internal temperature of 54° C. was obtained. The sausage was tempered at −3° C. for 3 hours, sliced to a uniform thickness and fried at 171° C. The fried sausage was analyzed for N-nitrosamine content, giving the following results.

| | Formula | N—Nitroso-pyrrolidine (ppb) | % Reduction of N—Nitroso-pyrrolidine Compared to Control |
|---|---|---|---|
| I | Control | 62 ± 6 | — |
| II | Alpha-Tocopherol Test | 27 ± 8 | 56 |
| III | Glucose/Aro-Smoke Test | 33 ± 5 | 46 |
| IV | Glucose/Prepared Smoke Test | 40 ± 6 | 35 |
| V | Glucose/Neutralized CharSol C-6 Test | 36 ± 3 | 42 |
| VI | Glucose/Aro-Smoke/Alpha-Tocopherol Test | 13 ± 5 | 79 |
| VII | Glucose/Prepared Smoke/Alpha-Tocopherol Test | 15 ± 2 | 76 |
| VIII | Glucose/Neutralized Charsol C-6/Alpha-Tocopherol Test | 19 ± 4 | 69 |

These results clearly show that a pickle composition comprising alpha-tocopherol, liquid smoke and glucose provides a substantially greater reduction in N-nitrosopyrrolidines than do compositions comprising alpha-tocopherol or glucose/liquid smoke alone.

EXAMPLE 3

Six curing pickles were prepared having the following compositions:

| | | | Percentage in Pickle | | | | | |
|---|---|---|---|---|---|---|---|---|
| Ingredient | Control I | II | III | IV | V | VI | VII | VIII |
| Water | 81.74 | 81.24 | 78.74 | 79.74 | 77.24 | 78.24 | 79.24 | 76.74 |
| Sodium Chloride | 15.0 | 15.0 | 15.0 | 15.0 | 15.0 | 15.0 | 15.0 | 15.0 |
| Sodium Tripolyphosphate | 2.50 | 2.50 | 2.50 | 2.50 | 2.50 | 2.50 | 2.50 | 2.50 |
| Sodium Erythorbate Monohydrate | 0.60 | 0.60 | 0.60 | 0.60 | 0.60 | 0.60 | 0.60 | 0.60 |
| Sodium Nitrite | 0.156 | 0.156 | 0.156 | 0.156 | 0.156 | 0.156 | 0.156 | 0.156 |
| Glucose | — | — | 1.5 | 1.5 | 1.5 | 1.5 | 1.5 | 1.5 |
| Aro-Smoke | — | — | 1.5 | — | — | 1.5 | — | — |
| Prepared Smoke | — | — | — | 0.5 | — | — | 0.5 | — |
| Neutralized CharSol C-6 | — | — | — | — | 3.0 | — | — | 3.0 |
| d-alpha-Tocopherol | — | 0.5 | — | — | — | 0.5 | 0.5 | 0.5 |

Fresh skinless bellies were ground through a ½-inch plate and mixed to uniformity in a ribbon mixer. Each of the above curing compositions was formulated, added to 15-pound individual portions of the ground pork at a level of 10% based on the weight of the meat, and each resulting mixture was blended for two minutes. For those curing compositions which were not homogene-

| Ingredient | Control I | II | III | IV | V | VI |
|---|---|---|---|---|---|---|
| Water | 83.63 | 81.63 | 81.63 | 83.13 | 79.63 | 79.13 |
| Sodium Chloride | 15.0 | 15.0 | 15.0 | 15.0 | 15.0 | 15.0 |
| Sodium Tripolyphosphate | 0.63 | 0.63 | 0.63 | 0.63 | 0.63 | 0.63 |
| Sodium Erythorbate Monohydrate | 0.60 | 0.60 | 0.60 | 0.60 | 0.60 | 0.60 |

-continued

Six curing pickles were prepared having the following compositions:

| Ingredient | Percentage in Pickle | | | | | |
|---|---|---|---|---|---|---|
| | Control I | II | III | IV | V | VI |
| Sodium Nitrite | 0.12 | 0.12 | 0.12 | 0.12 | 0.12 | 0.12 |
| Flavoring | 0.02 | 0.02 | 0.02 | 0.02 | 0.02 | 0.02 |
| Glucose | — | — | 2.0 | — | 2.0 | 2.0 |
| Aro-Smoke | — | 2.0 | — | — | 2.0 | 2.0 |
| Alpha-Tocopherol | — | — | — | 0.5 | — | 0.5 |

Fifteen-pound portions of ground pork were mixed with 10% quantities of the above pickles and the pork was treated as described in the previous example to give sausage which, when cooked, had the following N-nitrosamine levels.

| | Formula | N—Nitroso-pyrrolidine (ppb) | % Reduction of N—Nitroso-pyrrolidine Compared to Control |
|---|---|---|---|
| I | Control | 17.9 | — |
| II | 0.2% Aro-Smoke Test | 7.7 | 57 |
| III | 0.2% Glucose Test | 11.4 | 36 |
| IV | 0.05% Alpha-Tocopherol Test | 10.8 | 40 |
| V | 0.2% Glucose/0.2% Aro-Smoke Test | 6.7 | 63 |
| VI | 0.2% Glucose/0.2% Aro-Smoke/0.05% Alpha-Tocopherol Test | 3.45 | 81 |

These results again show the superiority of the pickle comprising all three components.

EXAMPLE 4

Sixteen curing solutions were prepared having the following compositions:

| Ingredient | Percentage in Curing Solution | | | | | | | |
|---|---|---|---|---|---|---|---|---|
| | Control 1 | 2 | 3 | 4 | 5 | 6 | 7 | 8 |
| Water | 81.744 | 78.744 | 79.744 | 81.244 | 78.244 | 79.244 | 81.744 | 78.744 |
| Salt | 15.0 | 15.0 | 15.0 | 15.0 | 15.0 | 15.0 | 15.0 | 15.0 |
| Sodium Tripolyphosphate | 2.5 | 2.5 | 2.5 | 2.5 | 2.5 | 2.5 | 2.5 | 2.5 |
| Sodium Erythorbate Monohydrate | 0.6 | 0.6 | 0.6 | 0.6 | 0.6 | 0.6 | 0.6 | 0.6 |
| Sodium Nitrite | 0.156 | 0.156 | 0.156 | 0.156 | 0.156 | 0.156 | 0.156 | 0.156 |
| Glucose | — | 3.0 | — | — | 3.0 | — | — | 3.0 |
| Aro-Smoke | — | — | 2.0 | — | — | 2.0 | — | — |
| Alpha-Tocopherol | — | — | — | 0.5 | 0.5 | 0.5 | — | — |

| Ingredient | Percentage in Curing Solution | | | | | | | |
|---|---|---|---|---|---|---|---|---|
| | Control 9 | 10 | 11 | 12 | 13 | 14 | 15 | 16 |
| Water | 79.744 | 81.244 | 78.244 | 79.244 | 81.744 | 76.244 | 81.744 | 76.744 |
| Salt | 15.0 | 15.0 | 15.0 | 15.0 | 15.0 | 15.0 | 15.0 | 15.0 |
| Sodium Tripolyphosphate | 2.5 | 2.5 | 2.5 | 2.5 | 2.5 | 2.5 | 2.5 | 2.5 |
| Sodium Erythorbate Monohydrate | 0.6 | 0.6 | 0.6 | 0.6 | 0.6 | 0.6 | 0.6 | 0.6 |
| Sodium Nitrite | 0.156 | 0.156 | 0.156 | 0.156 | 0.156 | 0.156 | 0.156 | 0.156 |
| Glucose | — | — | 3.0 | — | — | 3.0 | — | 3.0 |
| Aro-Smoke | 2.0 | — | — | 2.0 | — | 2.0 | — | 2.0 |
| Alpha-Tocopherol | — | 0.5 | 0.5 | 0.5 | — | 0.5 | — | 0.5 |

Four different lots of ground meat were prepared having the following compositions:
Lot A. 100% ground pork
Lot B. 90% ground pork + 10% ground beef
Lot C. 75% ground pork + 25% ground beef
Lot D. 90% ground pork + 10% ground turkey Curing solutions 1 through 6 were added to separate portions of the ground meat of Lot A; curing solutions 7 through 12 were added to separate portions of the ground meat of Lot B; curing solutions 13 and 14 were added to separate portions of the ground meat of Lot C; and curing solutions 15 and 16 were added to separate portions of the ground meat of Lot D. The level of curing solution was 10% based on the weight of the meat. The ingoing levels of sodium nitrite were 156 ppm in each case. Following heat processing, in a manner similar to bacon, samples were tempered for 24 hours. Following slicing, samples were fried according to USDA recognized procedures in a preheated electric skillet and analyzed for nitrosamines, with the following results:

| FORMULA | INHIBITOR | TYPE OF MEAT IN MODEL SYSTEM | NITROSO-PYRROLIDINE[1] ppb | % REDUCTION[2] IN NITROSO-PYRROLIDINE |
|---|---|---|---|---|
| 1 | Control | Pork | 45.7 ± 3.8[a] | — |
| 2 | 0.3% Glucose | Pork | 27.8 ± 3.3[b] | 39.1 |

-continued

| FORMULA | INHIBITOR | TYPE OF MEAT IN MODEL SYSTEM | NITROSO-PYRROLIDINE[1] ppb | % REDUCTION[2] IN NITROSO-PYRROLIDINE |
|---|---|---|---|---|
| 3 | 0.2% Aro-Smoke | Pork | 28.6 ± 4.4[b] | 37.4 |
| 4 | 500 ppm α-Tocopherol | Pork | 22.1 ± 0.3[c] | 51.7 |
| 5 | 0.3% Glucose/500 ppm α-Tocopherol | Pork | 12.2 ± 3.2[d] | 73.2 |
| 6 | 0.2% Aro-Smoke/500 ppm α-Tocopherol | Pork | 16.1 ± 4.4[d] | 64.7 |
| 7 | Control | 90% Pork + 10% Beef 50 | 32.6 ± 4.6[a] | — |
| 8 | 0.3% Glucose | 90% Pork + 10% Beef 50 | 21.7 ± 2.4[b] | 33.6 |
| 9 | 0.2% Aro-Smoke | 90% Pork + 10% Beef 50 | 17.1 ± 0.7[c] | 47.6 |
| 10 | 500 ppm α-Tocopherol | 90% Pork + 10% Beef 50 | 17.5 ± 2.2[c] | 46.5 |
| 11 | 0.3% Glucose/500 ppm α-Tocopherol | 90% Pork + 10% Beef 50 | 8.9 ± 0.4[d] | 72.9 |
| 12 | 0.2% Aro-Smoke/500 ppm α-Tocopherol | 90% Pork + 10% Beef 50 | 10.1 ± 1.1[d] | 69.1 |
| 13 | Control | 75% Pork + 25% Beef 50 | 25.4 ± 3.7[a] | — |
| 14 | 0.3% Glucose/0.2% Aro-Smoke/ 500 ppm α-Tocopherol | 75% Pork + 25% Beef 50 | 5.5 ± 4.1[b] | 78.5 |
| 15 | Control | 90% Pork + 10% MDM Turkey | 41.0 ± 4.7[a] | — |
| 16 | 0.3% Glucose/0.2% Aro-Smoke/ 500 ppm α-Tocopherol | 90% Pork + 10% MDM Turkey | 8.6 ± 0.6[b] | 79.1 |

[a-d]means with different superscripts are significantly different ($p \leq 0.05$). Duncan's Multiple Range Test.
[1]Mean ± standard deviation from n = 4 determinations.
[2]% Reduction relative to appropriate meat control.

EXAMPLE 5

Four curing pickles were prepared having the following compositions. Composition IV was prepared by preblending the alpha-tocopherol and the Aro-Smoke and then adding the mixture to the remaining pickle ingredients.

| | Percentage in Pickle | | | |
|---|---|---|---|---|
| Ingredient | Control I | II | III | IV |
| Water | 81.83 | 80.33 | 78.83 | 78.53 |
| Sodium Chloride | 15.00 | 15.00 | 15.00 | 15.00 |
| Sodium Tripolyphosphate | 2.50 | 2.50 | 2.50 | 2.50 |
| Sodium Erythorbate Monohydrate | 0.54 | 0.54 | 0.54 | 0.54 |
| Sodium Nitrite | 0.11 | 0.11 | 0.11 | 0.11 |
| Flavoring | 0.02 | 0.02 | 0.02 | 0.02 |
| Glucose | — | — | 1.5 | 1.5 |
| Aro-Smoke | — | 1.5 | 1.5 | 1.5 |
| Alpha-Tocopherol | — | — | — | 0.3 |

A total of 24 fresh skin-on green bellies were selected and divided into groups of six. Each group was pumped with one of the above compositions at a level of 10% based on the weight of each individual belly, and the bellies were conventionally processed to effect curing. The bellies were sliced and drafts six and seven were vacuum packaged. After 21 days, samples of the packaged bacon were fried according to USDA approved methods and analyzed for N-nitrosopyrrolidine content. The following results were obtained.

| Formula | Residual Nitrite | N—Nitroso-pyrrolidine (ppb) | % Reduction of N—Nitro-sopyrrolidine Compared to Control |
|---|---|---|---|
| I Control | 28 ± 15 | 42 ± 21 | — |
| II 0.15% Aro-Smoke Test | 28 ± 12 | 30 ± 18 | 29 |
| III 0.15% Aro-Smoke/ 0.15% Glucose Test | 23 ± 5 | 16 ± 7.3 | 62 |
| IV 0.15% Aro-Smoke/ 0.15% Glucose/ 0.03% Alpha-Tocopherol Test | 26 ± 7 | 6.6 ± 1.6 | 84 |

These results clearly show that bellies injected with pickle comprising liquid smoke, reducing sugar and tocopherol had remarkably reduced levels of N-nitrosopyrrolidine when fried, but that the levels of residual nitrite were virtually unaffected.

I claim:

1. A process for preparing a cured meat product which, when cooked for comsumption, contains substantially reduced levels of N-nitrosamines, comprising the steps of introducing into uncured meat a nitrite-containing curing composition, a tocopherol, and an inhibitor substance selected from the group consisting of preneutralized liquid smoke, buffered liquid smoke, reducing sugar, and mixtures thereof, and processing said meat to effect curing.

2. The process of claim 1 wherein the uncured meat is first ground and subsequently mixed with the nitrite-containing curing composition, the tocopherol and the inhibitor substance.

3. The process of claim 2 wherein the concentration of said tocopherol is 10–1,000 ppm, the liquid smoke is in concentration to provide 5–800 ppm phenols and 10–4,000 ppm carbonyl compounds, and the concentration of said reducing sugar is 10 ppm to 40,000 ppm, all said ppm concentrations being based on the weight of the uncured meat.

4. The process of claim 2 wherein the concentration of said tocopherol is 100–800 ppm, the liquid smoke is in concentration to provide 40–240 ppm phenols and 30–720 ppm carbonyl compounds, and the concentration of said reducing sugar is 1,000–9,000 ppm all said ppm concentrations being based on the weight of the uncured meat.

5. The process of claim 2 wherein the meat is ground pork.

6. The process of claim 2 wherein the meat is ground beef.

7. The process of claim 2 wherein the meat is ground poultry.

8. The process of claim 2 wherein said reducing sugar is glucose.

9. A process for preparing cured, unground meat which, when cooked for consumption, contains substantially reduced levels of N-nitrosamines, said process comprising the steps of
Preparing a nitrite-stable injectable curing solution comprising
a nitrite-containing pickle, a tocopherol, and an inhibitor substance selected from the group consisting of preneutralized liquid smoke, buffered liquid smoke, reducing sugar, and mixtures thereof;

Injecting said curing solution into uncured, unground meat; and

Processing said meat to effect curing.

10. The process of claim 9 wherein the pickle is buffered to stabilize the nitrite.

11. The process of claim 10 wherein the buffer is sodium tripolyphosphate.

12. The process of claim 9 wherein the said pickle is unbuffered and said liquid smoke is preneutralized to avoid depletion in the unbuffered pickle.

13. The process of claim 9 wherein the concentration of said tocopherol is 10–1000 ppm, the liquid smoke is in concentration to provide 5–400 ppm of phenols and 10–2000 ppm carbonyl compounds, and the concentration of the said reducing sugar is 150–30,000 ppm, all said ppm concentrations being based on the weight of the uncured meat.

14. The process of claim 9 wherein the concentration of said tocopherol is 100–500 ppm, the liquid smoke is in concentration to provide 40–120 ppm of phenols and 30–360 ppm carbonyl compounds, and the concentration of the said reducing sugar is 1,000–20,000 ppm, all said ppm concentrations being based on the weight of the uncured meat.

15. A process for preparing cured bacon which, when cooked for consumption, contains substantially reduced levels of N-nitrosamines, said process comprising the steps of Preparing a nitrite-stable injectable curing solution comprising A nitrite-containing pickle From 10 to 1000 ppm of tocopherol, based upon the green weight of the bacon belly to be injected A preneutralized or buffered liquid smoke in concentration to provide 5 to 400 ppm phenols and 10 to 2000 ppm carbonyl compounds, based upon the green weight of the bacon belly, the ratio of carbonyls to phenols being within the range of 0.5–5 to 1, An effective amount of a food grade emulsifier which does not substantially increase N-nitrosamine formation;

Injecting said curing solution into a green bacon belly; and

Processing said bacon belly to effect curing.

16. A process for preparing cured bacon which, when cooked for consumption, contains substantially reduced levels of N-nitrosamines, said process comprising the steps of Preparing a nitrite-stable injectable curing solution comprising A nitrite-containing pickle From 10 to 1000 ppm of tocopherol, based upon the green weight of the bacon belly to be injected, From 150 to 10,000 ppm of reducing sugar, based upon the green weight of the bacon belly, and An effective amount of a food grade emulsifier which does not substantially increase N-nitrosamine formation;

Injecting said curing solution into a green bacon belly; and

Processing said bacon belly to effect curing.

17. A process for preparing cured bacon which, when cooked for consumption, contains substantially reduced levels of N-nitrosamines, said process comprising the steps of Preparing a nitrite-stable injectable curing solution comprising A nitrite-containing pickle From 10 to 1000 ppm of tocopherol, based upon the green weight of the bacon belly to be injected A preneutralized or buffered liquid smoke in concentration to provide 5 to 400 ppm phenols and 10 to 2000 ppm carbonyl compounds, based on the green weight of the bacon belly, the ratio of carbonyls to phenols being within the range of 0.5 to 1, From 150 to 10,000 ppm of reducing sugar, based upon the green weight of the bacon belly, and An effective amount of a food grade emulsifier which does not substantially increase N-nitrosamine formation;

Injecting said curing solution into a green bacon belly; and

Processing said bacon belly to effect curing.

* * * * *